US010557342B2

(12) United States Patent
Ahmadi Kalateh Ahmad et al.

(10) Patent No.: US 10,557,342 B2
(45) Date of Patent: Feb. 11, 2020

(54) SURFACE EXCITATION RANGING METHODS AND SYSTEMS EMPLOYING A CUSTOMIZED GROUNDING ARRANGEMENT

(71) Applicant: Halliburton Energy Services, Inc., Houston, TX (US)

(72) Inventors: Akram Ahmadi Kalateh Ahmad, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 126 days.

(21) Appl. No.: 15/553,111

(22) PCT Filed: Mar. 25, 2015

(86) PCT No.: PCT/US2015/022536
§ 371 (c)(1),
(2) Date: Aug. 23, 2017

(87) PCT Pub. No.: WO2016/153507
PCT Pub. Date: Sep. 29, 2016

(65) Prior Publication Data
US 2018/0038219 A1    Feb. 8, 2018

(51) Int. Cl.
*E21B 47/022*    (2012.01)
*E21B 47/09*    (2012.01)
(Continued)

(52) U.S. Cl.
CPC ........ *E21B 47/02216* (2013.01); *E21B 47/09* (2013.01); *G01V 3/26* (2013.01); *G01V 3/083* (2013.01)

(58) Field of Classification Search
CPC .. E21B 47/02216; E21B 47/024; E21B 47/09; G01V 3/30; G01V 3/26; G01V 3/083
See application file for complete search history.

(56) References Cited

U.S. PATENT DOCUMENTS 4,372,398 A    2/1983 Kuckes
4,409,551 A    10/1983 Norton
(Continued)

FOREIGN PATENT DOCUMENTS

RU    2386810    4/2010
WO    2011133627    10/2011
(Continued)

OTHER PUBLICATIONS

European Search Report for Application No. EP 15886662 dated Oct. 11, 2018.
(Continued)

*Primary Examiner* — Michael R Wills, III
(74) *Attorney, Agent, or Firm* — Jason Sedano; C. Tumey Law Group PLLC (57) ABSTRACT

A surface excitation ranging method includes installing a customized grounding arrangement for a power supply located at earth's surface, wherein the customized grounding arrangement fulfills an impedance criteria or ranging performance criteria. The method also includes conveying an electrical current output from the power supply along a target well with a metal casing. The method also includes sensing electromagnetic (EM) fields emitted from the target well due to the electrical current. The method also includes using distance or direction information obtained from the sensed EM fields to guide drilling of a new well relative to the target well.

20 Claims, 5 Drawing Sheets

(51) Int. Cl.
*G01V 3/26* (2006.01)
*G01V 3/08* (2006.01)

(56) References Cited

U.S. PATENT DOCUMENTS

| | | | |
|---|---|---|---|
| 4,791,373 A | 12/1988 | Kuckes | |
| 5,041,792 A | 8/1991 | Thompson | |
| 5,218,301 A | 6/1993 | Kuckes | |
| 5,305,212 A * | 4/1994 | Kuckes | G01V 3/26 |
| | | | 324/346 |
| 5,343,152 A | 8/1994 | Kuckes | |
| 5,676,212 A | 10/1997 | Kuckes | |
| 7,812,610 B2 | 10/2010 | Clark et al. | |
| 8,912,915 B2 * | 12/2014 | Hay | G01V 11/002 |
| | | | 340/853.1 |
| 9,518,209 B2 | 12/2016 | Gamage | |
| 2006/0014648 A1 | 1/2006 | Milson et al. | |
| 2006/0041028 A1 | 2/2006 | Crews | |
| 2007/0218150 A1 | 9/2007 | Akashi et al. | |
| 2007/0256836 A1 | 11/2007 | Welton et al. | |
| 2007/0278008 A1 | 12/2007 | Kuckes et al. | |
| 2008/0128281 A1 | 6/2008 | Blikstad et al. | |
| 2009/0023613 A1 | 1/2009 | Li et al. | |
| 2009/0260878 A1 | 10/2009 | Morley et al. | |
| 2010/0010106 A1 | 1/2010 | Crews | |
| 2011/0030952 A1 | 2/2011 | Huang et al. | |
| 2011/0036025 A1 * | 2/2011 | Boulay | E02D 5/801 |
| | | | 52/157 |
| 2011/0308794 A1 | 12/2011 | Bittar et al. | |
| 2012/0061143 A1 | 3/2012 | Hay | |
| 2012/0326723 A1 | 12/2012 | Bloemenkamp et al. | |
| 2013/0098618 A1 | 4/2013 | Braganza et al. | |
| 2013/0118740 A1 | 5/2013 | Sherman et al. | |
| 2013/0118744 A1 | 5/2013 | Gamage et al. | |
| 2016/0097272 A1 * | 4/2016 | Moss | E21B 43/2406 |
| | | | 324/346 |
| 2016/0115779 A1 * | 4/2016 | Moss | E21B 7/04 |
| | | | 324/346 |
| 2018/0045034 A1 * | 2/2018 | Wu | E21B 7/04 |

FOREIGN PATENT DOCUMENTS

| | | |
|---|---|---|
| WO | 2014089402 | 6/2014 |
| WO | 2014089505 | 6/2014 |
| WO | 2016057241 | 4/2016 |

OTHER PUBLICATIONS

International Search Report and Written Opinion for PCT/US2015/022536 dated Dec. 18, 2015.
Colombian Office Action for Application No. NC2017/0008392 dated May 23, 2018.
Russian Search Report for Application No. 2017127015 dated Apr. 18, 2018.
International Search Report and Written Opinion for PCT/US16/19411 dated Sep. 29, 2016.
"Aqualinear® HT High Temperature Gravel Pack Fluid Service" from Halliburton. Dated 2012.
"Aqualinear™ Gravel Pack Fluid Service" from Halliburton. Dated 2005.
"BARASCAV™ D" Product Data Sheet from Halliburton. Dated 2010.
"OXYGON™ Scavenger" Product Data Sheet from Halliburton. Dated 2014.

* cited by examiner

SURFACE EXCITATION RANGING METHODS AND SYSTEMS EMPLOYING A CUSTOMIZED GROUNDING ARRANGEMENT

BACKGROUND

The world depends on hydrocarbons to solve many of its energy needs. Consequently, oilfield operators strive to produce and sell hydrocarbons as efficiently as possible. Much of the easily obtainable oil has already been produced, so new techniques are being developed to extract less accessible hydrocarbons. One such technique is steam-assisted gravity drainage ("SAGD") as described in U.S. Pat. No. 6,257,334, "Steam-Assisted Gravity Drainage Heavy Oil Recovery Process". SAGD uses a pair of vertically-spaced, horizontal wells less than about 10 meters apart.

In operation, the upper well is used to inject steam into the formation. The steam heats the heavy oil, thereby increasing its mobility. The warm oil (and condensed steam) drains into the lower well and flows to the surface. A throttling technique is used to keep the lower well fully immersed in liquid, thereby "trapping" the steam in the formation. If the liquid level falls too low, the steam flows directly from the upper well to the lower well, reducing the heating efficiency and inhibiting production of the heavy oil. Such a direct flow (termed a "short circuit") greatly reduces the pressure gradient that drives fluid into the lower well.

Short circuit vulnerability can be reduced by carefully maintaining the inter-well spacing, i.e., by making the wells as parallel as possible. (Points where the inter-well spacing is smaller than average provide lower resistance to short circuit flows.) In the absence of precision drilling techniques, drillers are forced to employ larger inter-well spacings than would otherwise be desirable, so as to reduce the effects of inter-well spacing variations. Precision placement of neighboring wells is also important in other applications, such as collision avoidance, infill drilling, observation well placement, coal bed methane degasification, and wellbore intersections for well control.

Electromagnetic (EM) ranging solutions have been developed to directly sense and measure the distance between pipes is nearby wells as the drilling commences in the latter well. Some multi-well EM ranging techniques are not cost effective as they involve multiple teams to deploy one or more wireline tools in an existing well, while a logging-while-drilling (LWD) is deployed in the new well being drilled. Meanwhile, an example single-well EM ranging technique (U.S. Pat. No. 7,812,610) relies on absolute magnetic field measurements for distance calculation, which does not produce reliable results due to variations of the current on the target pipe.

Another EM ranging technique, referred to herein as surface excitation ranging, utilizes a current source located at earth's surface and a target well. Specifically, current from the current source is provided to a metal casing of the target well, which causes the target well to emit EM fields along its length. The EM fields emitted from the target well can be used to guide drilling of a new well near the target well. Due to current leakage from the target well into the surrounding formation, surface excitation ranging can produce weak EM fields and poor signal-to-noise ratio (SNR) for sensors in deep wells. Increasing the amount of current injected into the target well would improve the EM field strength and SNR available for ranging, but such increases in current are not always possible for a given power supply and can be a safety hazard to workers at earth's surface.

BRIEF DESCRIPTION OF THE DRAWINGS

Accordingly, there are disclosed herein surface excitation ranging methods and systems employing a customized grounding arrangement. In the drawings.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed embodiments are directed to surface excitation ranging methods and systems employing a customized grounding arrangement. The discussion of customized grounding arrangements herein is relative to a base grounding arrangement that involves staking one or more traditional ground stakes at earth's surface, where each traditional ground stake has a radius of about 1 centimeter, a length of about 1 meter, and a conductivity of about $10^6$ S/m. As it has been determined that this base grounding arrangement may not provide a sufficiently low impedance (tested to be around 10.61 ohms) to allow for safe surface excitation ranging operations, one or more customized grounding arrangements are proposed to replace or supplement a base grounding arrangement.

In some embodiments, a customized grounding arrangement involves one or more customized ground stakes having an increased length and/or an increased radius relative to a traditional ground stake. Further, a customized grounding arrangement may involve a customized ground stake having deeper deployment and/or increased contact with the earth relative to a traditional ground stake. In different embodiments, an open borehole and/or a pilot hole can be used to control deployment depth of a customized ground stake and/or the amount of contact between a customized ground stake and the earth. Other customized grounding arrangement options involve using a downhole casing or rig anchor as a type of customized ground stake. In some embodiments, different customized grounding arrangement options are selected or combined until an impedance criteria and/or ranging performance criteria is met. Such criteria may vary, for example, depending on the length of a particular target well and/or the electrical properties (e.g., resistivity, conductivity, permeability) of the formation surrounding the target well. Previous test results, ongoing test results, or circumstances (e.g., availability of components, equipment, or nearby open boreholes or downhole casings) may be used to select the options for a particular customized grounding arrangement.

In at least some embodiments, an example surface excitation ranging method includes installing a customized grounding arrangement for a power supply located at earth's surface, where the customized grounding arrangement fulfills an impedance criteria or ranging performance criteria. The method also includes conveying an electrical current output from the power supply along a target well with a metal casing. The method also includes sensing electromagnetic (EM) fields emitted from the target well due to the electrical current. The method also includes using distance or direction information obtained from the sensed EM fields to guide drilling of a new well relative to the target well.

Meanwhile, an example surface excitation system includes a power supply located at earth's surface and a customized grounding arrangement for the power supply, where the customized grounding arrangement fulfills an impedance criteria or a ranging performance criteria. The system also includes a target well with a metal casing to convey an electrical current output from the power supply along its length. The system also includes at least one sensor to detect EM fields emitted from the target well due to the electrical current. The system also includes a directional drilling tool to drill a new well relative to the target well based on distance or direction information obtained from the detected EM fields. Various customized grounding arrangement options are disclosed herein.

Figure 1:
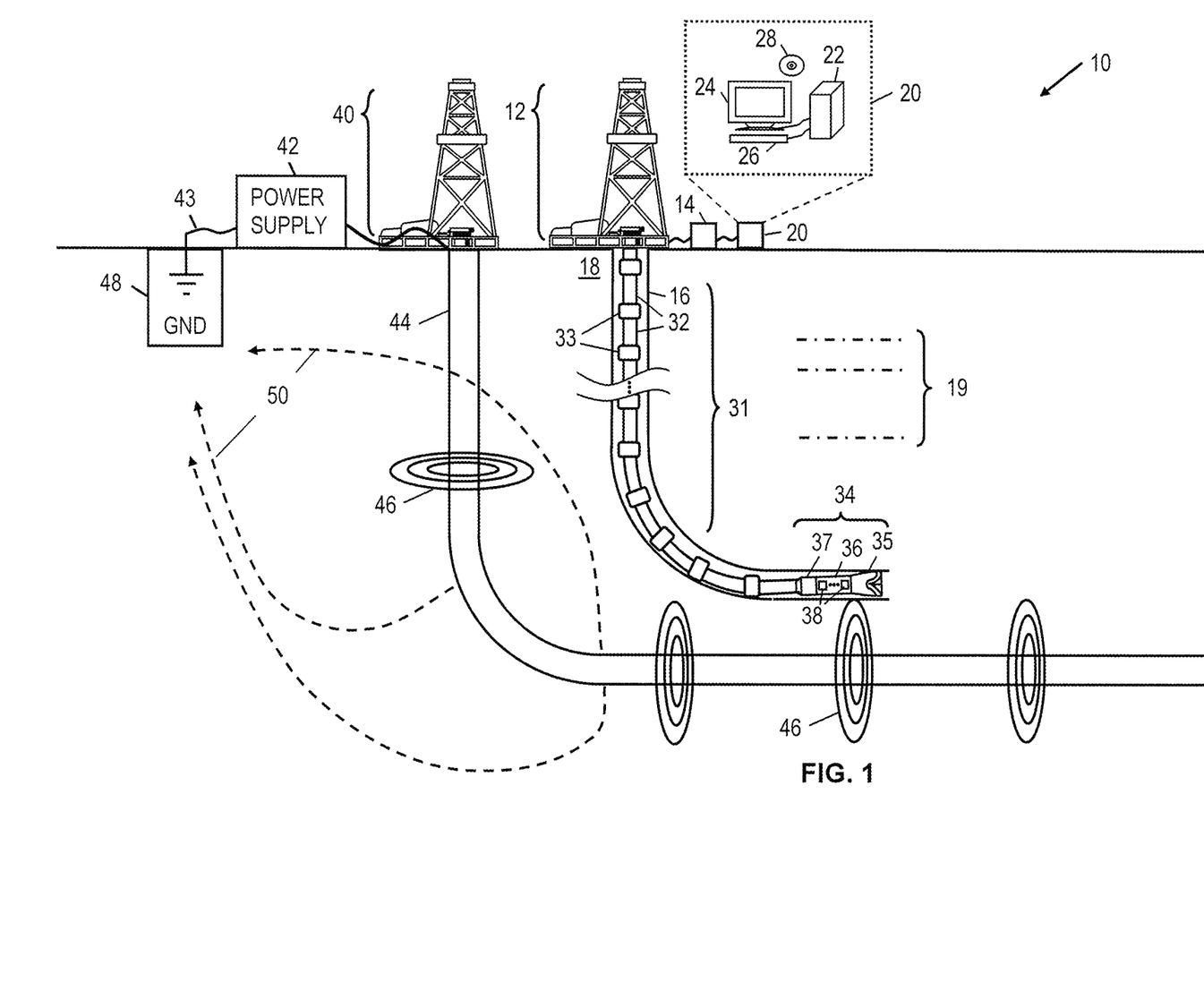
FIG. 1 is a schematic diagram of an illustrative surface excitation ranging scenario involving a customized grounding arrangement.

The disclosed surface excitation ranging methods and systems employing a customized grounding arrangement are best understood when described in an illustrative usage context. FIG. 1 shows an illustrative surface excitation ranging scenario 10 involving a customized grounding arrangement 48. In scenario 10, a new well 16 is being drilled relative to a target well 44 that has already been drilled and cased. The target well 44 can be drilled using a drilling assembly 40 and available drilling equipment. The new well 16 is drilled in the same manner, but with surface excitation ranging operations to guide drilling of the new well 16 relative to the target well 44. More specifically, the new well 16 is drilled using a drilling assembly 12 that enables a drill string 31 to be lowered to create new well 16 that penetrates formations 19 of the earth 18. The drill string 31 is formed, for example, from a modular set of drill string segments 32 and possibly adaptors 33. At the lower end of the drill string 31, a bottomhole assembly (BHA) 34 with a drill bit 35 removes material from the earth 18. To facilitate removal of material, the drill bit 35 can rotate by turning the drill string 31 with the drilling assembly 12 and/or by use of a motor (e.g., a mud motor) included with the BHA 34. Further, drilling fluid can be circulated to remove cuttings from the new well 16. For example, such drilling fluid can be pumped down the drill string 31, out orifices in the drill bit 35, and back to earth's surface along the annular space in the new well 16.

The bottomhole assembly 34 also includes one or more drill collars 37 and a logging tool 36 with one or more EM field sensor units 38 and/or other sensors. In some embodiments, the EM field sensor units 38 correspond to a plurality of inductive loops oriented in different directions. In the surface excitation ranging scenario 10, the EM field sensor units 38 measure EM fields 46 generated by an electrical current conveyed by a metal casing in the target well 44, where the electrical current is provided to the target well 44 by a power supply 42 at earth's surface. The logging tool 36 may also include electronics for data storage, communications, etc. The EM field measurements and/or other measurements collected by the logging tool 36 are conveyed to earth's surface and/or are stored by the logging tool 36. In either case, the EM field measurements can be processed (downhole or at earth's surface) to determine distance or direction information that can be used to guide directional drilling operations that determine the trajectory of the new well 16. In at least some embodiments, the determined distance or direction information corresponds to the distance and direction of the BHA 34 (or a point along the BHA 34) relative to the target well 44.

To convey EM field measurements or other types of measurements to earth's surface, the logging tool 36 may employ one or more telemetry options such as mud pulse telemetry, acoustic telemetry, EM telemetry, and/or wired telemetry. At earth's surface, an interface 14 receives measurements from the logging tool 36 and conveys the measurements to a computer system 20. In some embodiments, the surface interface 14 and/or the computer system 20 may perform various operations such as converting signals from one format to another, storing measurements and/or processing measurements. As an example, in at least some embodiments, the computer system 20 includes a processing unit 22 that determines distance and/or direction information from EM field measurements as described herein by executing software or instructions obtained from a local or remote non-transitory computer-readable medium 28. The computer system 20 also may include input device(s) 26 (e.g., a keyboard, mouse, touchpad, etc.) and output device(s) 24 (e.g., a monitor, printer, etc.). Such input device(s) 26 and/or output device(s) 24 provide a user interface that enables an operator to interact with the logging tool 36 and/or software executed by the processing unit 22. For example, the computer system 20 may enable an operator to view collected measurements, to view processing results, to select power supply options, to select directional drilling options, and/or to perform other tasks related to scenario 10.

In scenario 10, a customized grounding arrangement 48 for the power supply 42 is represented, where the customized grounding arrangement 48 fulfills an impedance criteria or ranging performance criteria. The power supply 42 may be connected to the customized grounding arrangement 48 via an insulated cable 43. In at least some embodiments, the insulated cable 43 extends from the power supply 42 to a location below earth's surface to reduce risk to workers at earth's surface. As represented by dashed lines 50, at least some of the electrical current conveyed along the target well 44 leaks into the earth 18 and returns to the customized grounding arrangement 48. Due to current leakage into the earth 18, the amount of electrical current conveyed along the target well 44 attenuates over the length of the target well 44. To improve the strength of the EM fields 46 emitted by the target well 44, the voltage and/or current levels output from the power supply 42 can be increased (perhaps a larger capacity power supply is needed). However, such increases in the voltage and/or current levels output from the power supply 42 may raise the risk of injury to workers at earth's surface, especially if components of the power supply 42 or the customized grounding arrangement 48 are exposed to earth's surface. In an example surface excitation ranging scenario, the current level is 100 A and the voltage level is between 40-50V, resulting in a power level of 4-5 kW.

Accordingly, the customized grounding arrangement 48 is based on an impedance criteria and/or ranging criteria that reduces the level of risk involved while enabling ranging operations as the new well 16 extends further along relative to the target well 44. As needed, adjustments can be made to the customized grounding arrangement 48 to reduce the impedance in response to one or more tests. For example, the test may measure an impedance associated with the customized grounding arrangement 48 and/or a signal-to-noise-ratio (SNR) of the EM fields 46 at some point along the target well 44.

Figure 2A:
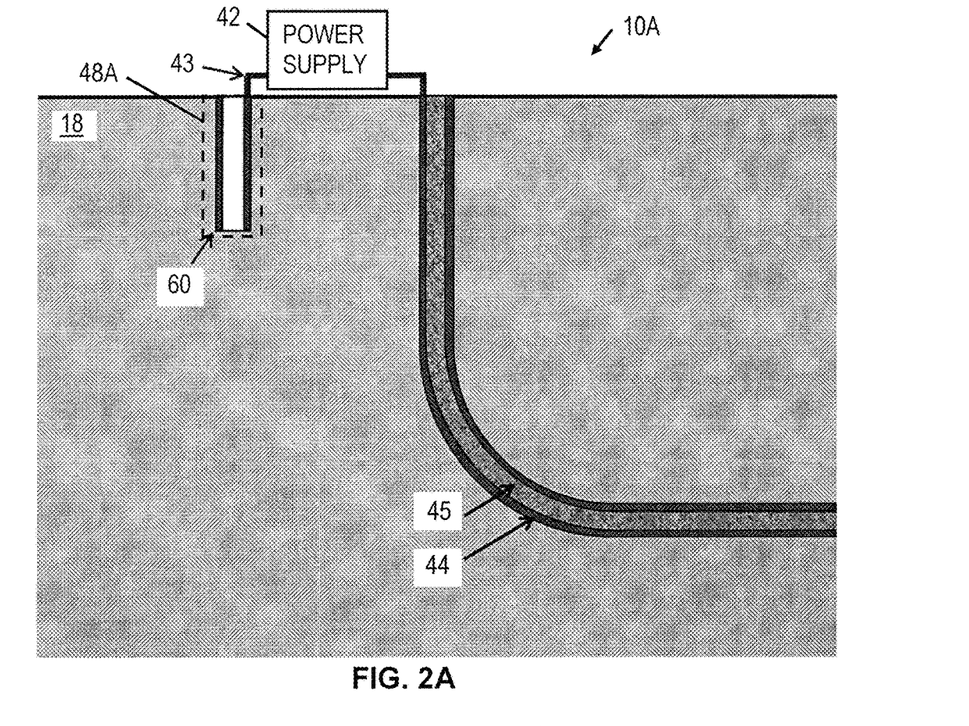
FIG. 2A is a schematic diagram showing part of surface excitation ranging scenario including a first customized grounding arrangement.

There are various options available for the customized grounding arrangement 48. FIG. 2A shows part of a surface excitation ranging scenario 10A that includes a first customized grounding arrangement 48A. In scenario 10A, the target well 44 is represented as being filled with low-resistivity drilling mud 45, and the first customized grounding arrangement 48A is shown to include a downhole casing 60 connected to the power supply 42 via an insulated cable 43. The downhole casing 60 may be correspond to one or more one casing segments (each segment typically has a length of about 30 feet) in contact with the earth 18. In some embodiments, the downhole casing 60 is installed in response to a test (e.g., an impedance test or SNR test). Alternatively, the downhole casing 60 may be available due to other wells having been previously drilled and cased. When available, a downhole casing 60 that is spaced from and within a predetermined range of the target well 44 can be used as a customized ground stake that supplements or replaces traditional ground stakes. A downhole casing 60 as in the surface excitation ranging scenario 10A may also supplement or replace the other customized grounding arrangement options described herein. The impedance for a customized grounding arrangement involving a downhole casing 60 with $\sigma=10^6$S/m, $\mu_r=100$, outer radius=0.1 meters, inner radius=0.09 meters, and length=30 meters, has been estimated to be about 0.46 ohms.

Figure 2B:
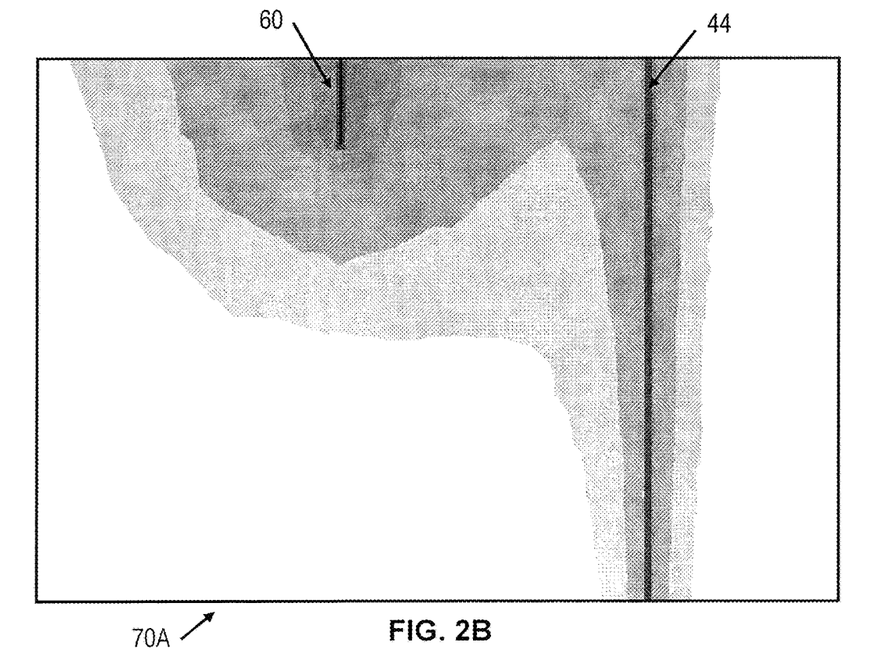
FIG. 2B is a plot representing underground current distribution related to the first customized grounding arrangement of FIG. 2A.

FIG. 2B is a plot 70A representing an underground current distribution related to the first customized grounding arrangement 48A. In plot 70A, current intensity is represented using grayscale values, where white corresponds to lowest current intensity and black correspond to highest current intensity. As shown in plot 70A, the highest current intensity regions in the earth 18 are near the target well 44 and the downhole casing 60 used in the first customized grounding arrangement 48A.

Figure 3A:
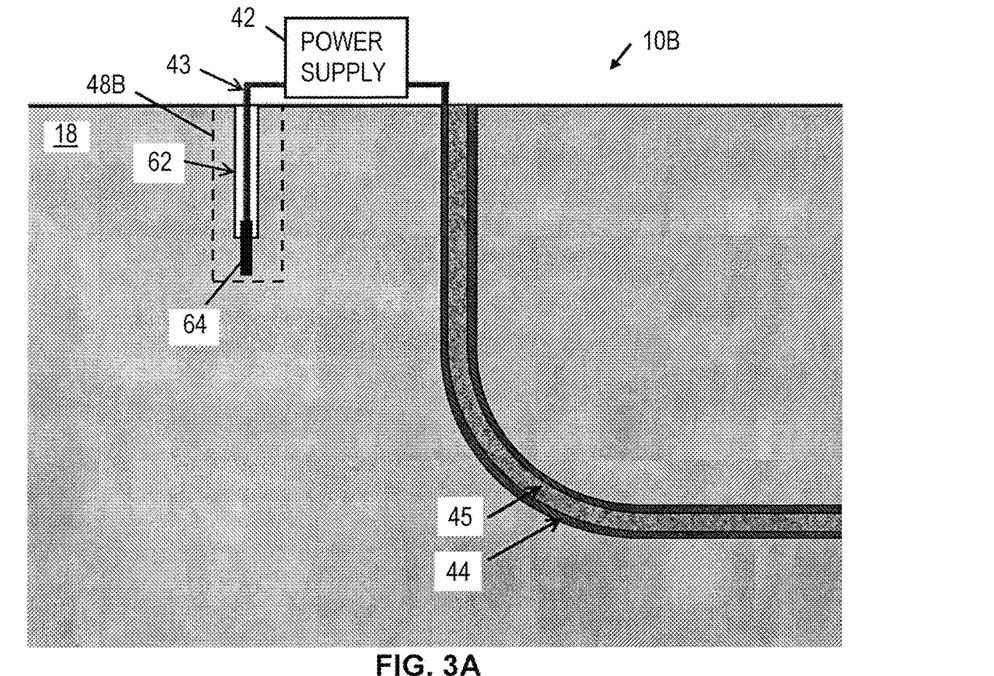
FIG. 3A is a schematic diagram showing part of surface excitation ranging scenario including a second customized grounding arrangement.

FIG. 3A shows part of a surface excitation ranging scenario 10B that includes a second customized grounding arrangement 48B. In scenario 10B, the target well 44 is again represented as being filled with drilling mud 45. The second customized grounding arrangement 48B is shown to include a downhole ground stake 64 installed in an open borehole 62 in the earth 18 and connected to the power supply 42 via an insulated cable 43. The open borehole 62 may be a new borehole drilled to install the downhole ground stake 64 or an available borehole nearby the target well 44. In some embodiments, a fiber glass insert or casing is used to maintain the integrity of the open borehole 62. As an option, the downhole ground stake 64 may be installed using a pilot hole instead of or in addition to the open borehole 62. The open borehole 62 and/or pilot hole is spaced from and within a predetermined range of the target well 44. In some embodiments, the downhole ground stake 64 corresponds to an exposed portion of a grounding cable (e.g., the insulated cable 43 can be used, where the end of the insulated cable 43 is exposed). In other embodiments, the downhole ground stake 64 corresponds to a customized ground stake having an increased length and/or an increased radius relative to a traditional ground stake. As an example, the downhole ground stake 64 may have a length of at least 10 meters, where most of the downhole ground stake 64 is in direct contact with the earth 18 once installation in complete. In some embodiments, the downhole ground stake 64 is installed in response to a test (e.g., an impedance test or SNR test). A downhole ground stake 64 as in the surface excitation ranging scenario 10B may supplement or replace traditional ground stakes and/or the other customized grounding arrangement options described herein. The impedance for a customized grounding arrangement involving a downhole ground stake (radius=1 cm, length=10 meters, and $\sigma=10^6$S/m) installed in an open borehole with a length of 20 meters, has been estimated to be about 3.09 ohms.

Figure 3B:
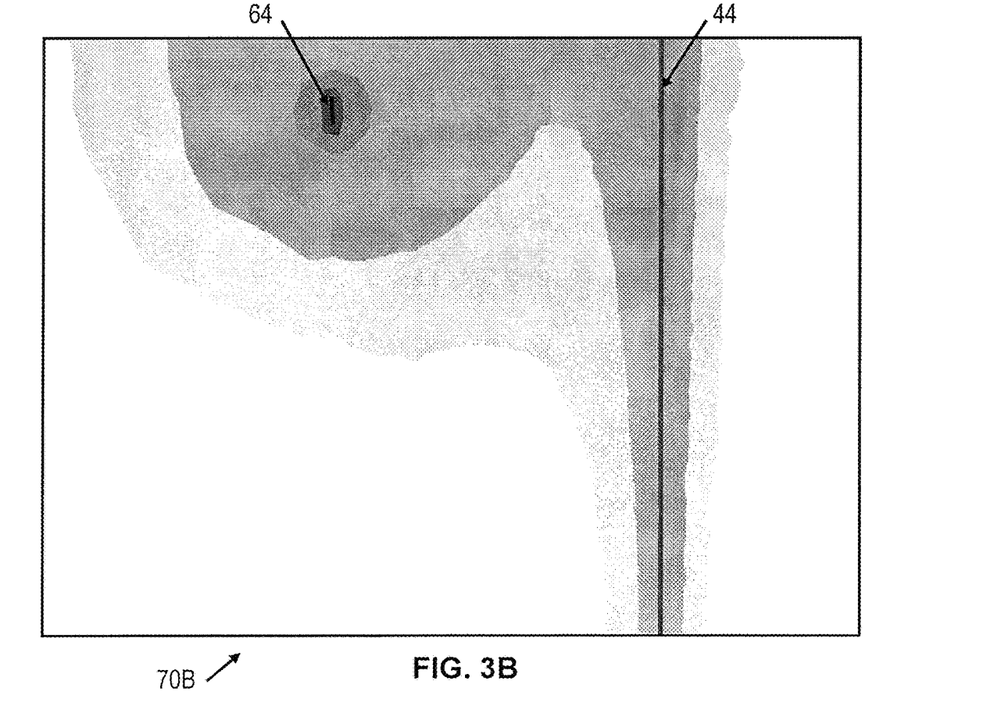
FIG. 3B is a plot representing underground current distribution related to the second customized grounding arrangement of FIG. 3A.

FIG. 3B is a plot 70B representing an underground current distribution related to the second customized grounding arrangement 48B. In plot 70B, current intensity is represented using grayscale values, where white corresponds to lowest current intensity and black corresponds to highest current intensity. As shown in plot 70B, the highest current intensity regions in the earth 18 are near the target well 44 and the downhole ground stake 64 used in the second customized grounding arrangement 48B. As seen in plot 70B, the highest current intensity region associated with the downhole ground stake 64 is concentrated downhole and does not extend to earth's surface, resulting in a safer working environment at earth's surface.

Figure 4A:
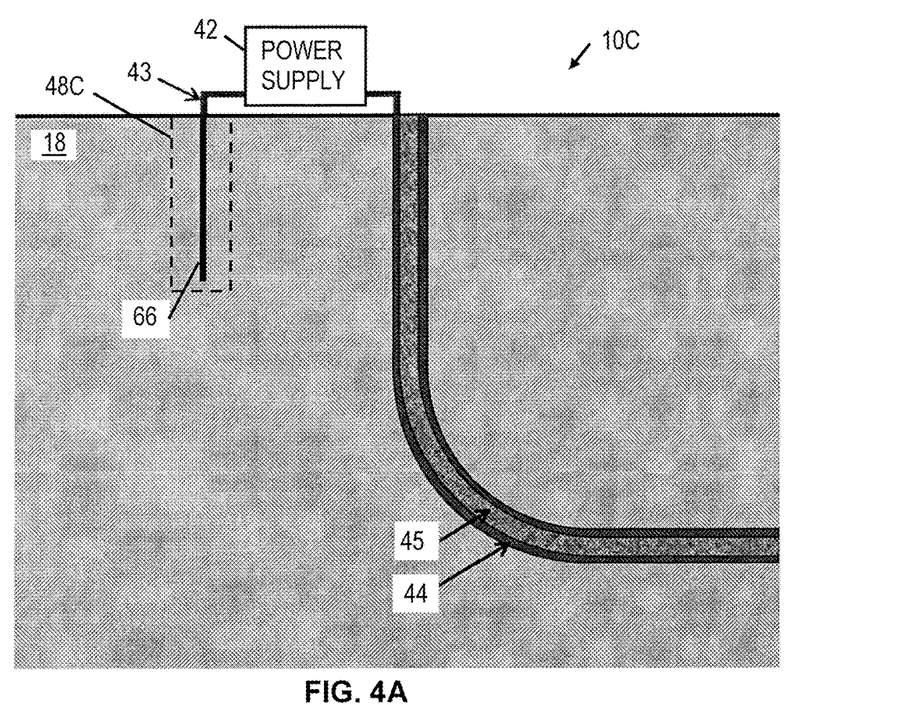
FIG. 4A is a schematic diagram showing part of surface excitation ranging scenario including a third customized grounding arrangement.

FIG. 4A shows part of a surface excitation ranging scenario 10C that includes a third customized grounding arrangement 48C. In scenario 10C, the target well 44 is again represented as being filled with drilling mud 45. The third customized grounding arrangement 48C is shown to include an elongated ground stake 66 that extends deep into the earth 18. The elongated ground stake 66 is connected to the power supply 42 via an insulated cable 43. To install the elongated ground stake 66 deep into the earth 18, a pilot hole may be used. Additionally or alternatively, a specialized tool or rig may be employed to push or hammer the elongated ground stake 66 into the earth 18 such that a predetermined portion of the elongated ground stake 66 is underground and in contact with the earth 18. The elongated ground stake 66 has an increased length and perhaps an increased radius relative to a traditional ground stake. As an example, the elongated ground stake 66 may have a length of at least 30 meters, where most of the elongated ground stake 66 is in direct contact with the earth 18 once installation in complete. In some embodiments, the elongated ground stake 66 is installed in response to a test (e.g., an impedance test or SNR test). An elongated ground stake 66 as in the surface excitation ranging scenario 10C may supplement or replace traditional ground stakes and/or the other customized grounding arrangement options described herein. The impedance for a customized grounding arrangement involving an elongated ground stake (radius=1 cm, length=30 meters, and σ=10⁶S/m), where most of the elongated ground stake contacts the earth, has been estimated to be about 1.28 ohms.

Figure 4B:
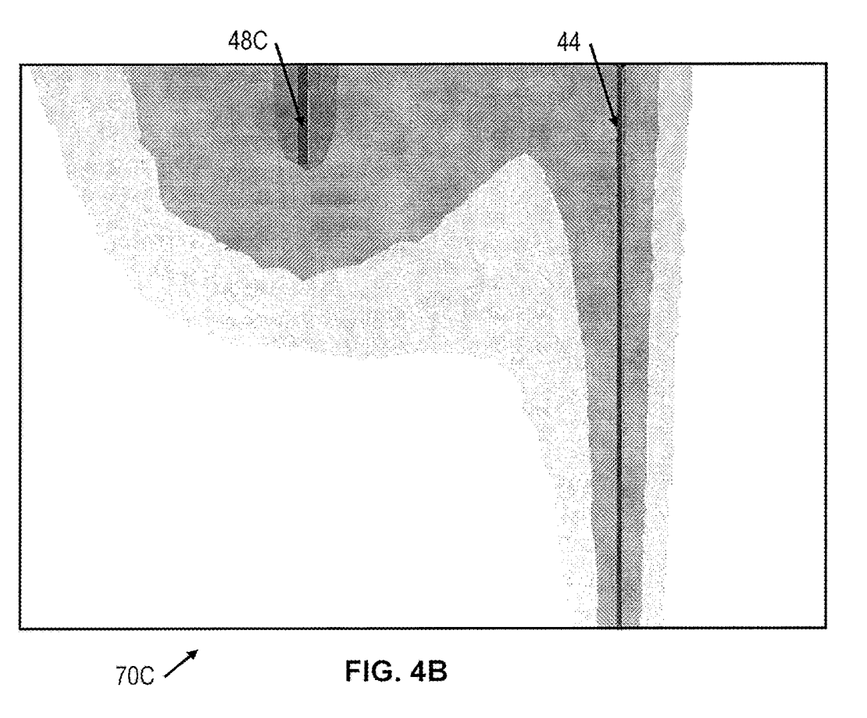
FIG. 4B is a plot representing underground current distribution related to the third customized grounding arrangement of FIG. 4A.

FIG. 4B is a plot 70r representing an underground current distribution related to the third customized grounding arrangement 48C. In plot 70C, current intensity is represented using grayscale values, where white corresponds to lowest current intensity and black corresponds to highest current intensity. As shown in plot 70C, the highest current intensity regions are near the target well 44 and the elongated ground stake 66 used in the third customized grounding arrangement 48C. Without limitation, the second customized grounding arrangement 48B may be preferred over the first customized grounding arrangement 48A and the third customized grounding arrangement 48A as the second customized grounding arrangement 48B concentrates the current intensity below earth's surface, resulting in a safer working environment at earth's surface. However, it should be appreciated that all of the customized grounding arrangements 48A, 48B, and 48C provide improved safety relative to the base grounding arrangement presented. Another customized grounding arrangement option involves using a rig anchor as a customized ground stake.

Figure 5:
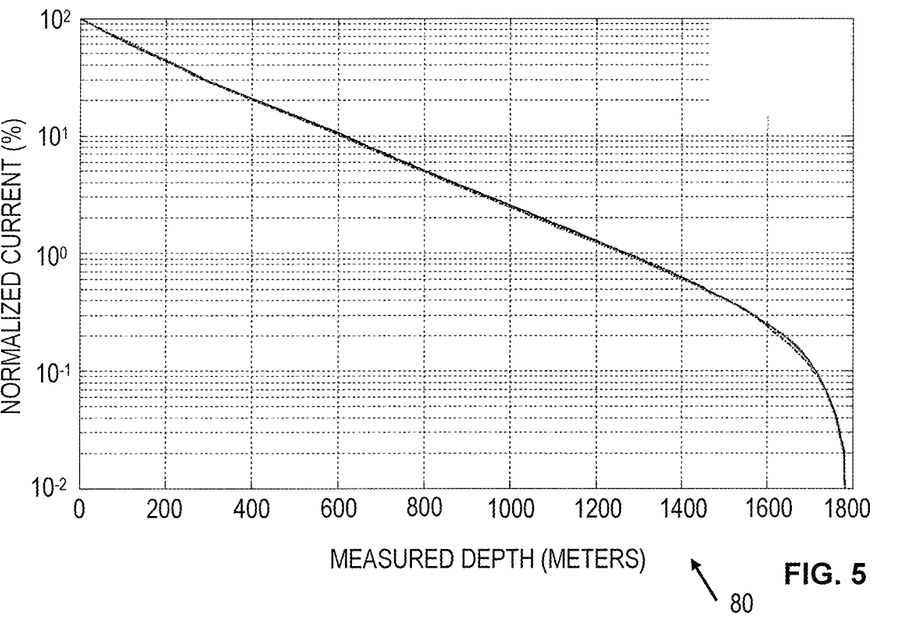
FIG. 5 is a graph showing normalized current distribution curves as a function of measured depth for different customized grounding arrangements.

FIG. 5 is a graph 80 showing normalized current distribution curves as a function of measured depth for different customized grounding arrangements. As shown in graph 80, the current attenuation along a target well for different customized grounding arrangements is approximately the same.

Figure 6:
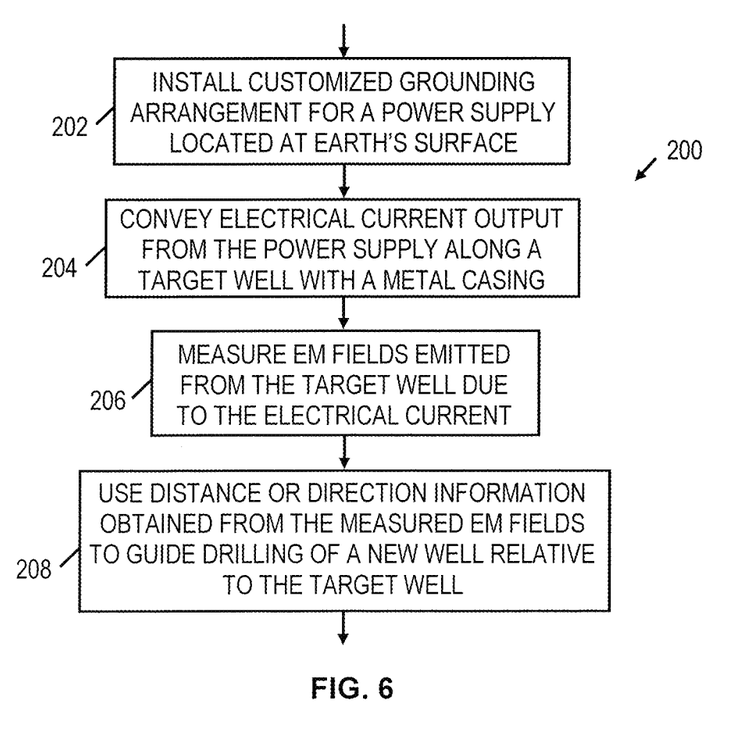
FIG. 6 is a flowchart of an illustrative surface excitation ranging method involving a customized grounding arrangement.

FIG. 6 is a flowchart 200 of an illustrative surface excitation ranging method 200 involving a customized grounding arrangement. As shown, the method 200 includes installing a customized grounding arrangement for a power supply located at earth's surface at block 202. The customized grounding arrangement is based on an impedance criteria or a ranging performance criteria. The impedance criteria or ranging performance criteria may be based on testing operations to measure a grounding impedance or ranging performance. Such testing operations may be performed during ranging operations or before ranging operations. Further, experience from previous surface excitation ranging and customized grounding arrangement projects can be used to guide new projects. Further, available or new logs related to electromagnetic properties of the earth near a target well or new well can be used to select options for the customized grounding arrangement. As desired, customized grounding arrangement options can be combined or adjusted (e.g., a longer ground stake or deeper installation can be used). Once installation of the customized grounding arrangement is complete (or is adjusted in response to a test as the case may be), the method 200 involves conveying an electrical current output from the power supply along a target well with a metal casing (block 204). At block 206, EM fields emitted from the target well due to the electrical current are measured. At block 208, distance or direction information obtained from the measured EM fields are used to guide drilling a new well relative to the target well.

Embodiments Disclosed Herein Include:

A: A surface excitation ranging method that comprises installing a customized grounding arrangement for a power supply located at earth's surface, wherein the customized grounding arrangement fulfills an impedance criteria or ranging performance criteria. The method also comprises conveying an electrical current output from the power supply along a target well with a metal casing. The method also comprises sensing EM fields emitted from the target well due to the electrical current. The method also comprises using distance or direction information obtained from the sensed EM fields to guide drilling of a new well relative to the target well.

B: A surface excitation ranging system that comprises a power supply located at earth's surface and a customized grounding arrangement for the power supply, wherein the customized grounding arrangement fulfills an impedance criteria or a ranging performance criteria. The system also comprises a target well with a metal casing to convey an electrical current output from the power supply along its length. The system also comprises at least one sensor to detect EM fields emitted from the target well due to the electrical current. The system also comprises a directional drilling tool to drill a new well relative to the target well based on distance or direction information obtained from the detected EM fields.

Each of the embodiments, A and B, may have one or more of the following additional elements in any combination. Element 1: wherein installing the customized grounding arrangement comprises connecting the power supply to a metal casing installed in a well separate from the target well and the new well. Element 2: wherein installing the customized grounding arrangement comprises connecting the power supply to a ground stake deployed entirely below earth's surface. Element 3: further comprising drilling an open borehole or using an available open borehole to deploy the ground stake entirely below earth's surface. Element 4: further comprising drilling a pilot hole to deploy the ground stake entirely below earth's surface. Element 5: wherein installing the customized grounding arrangement comprises connecting the power supply to an elongated ground stake with an underground length that exceeds a predetermined threshold. Element 6: wherein installing the customized grounding arrangement comprises connecting the power supply to a grounding cable having an insulated portion and an exposed portion, and wherein the exposed portion is below earth's surface. Element 7: further comprising spacing the customized grounding arrangement from the target well based on predetermined distance or range criteria, and extending an insulated cable between the power supply and a grounding location below earth's surface. Element 8: further comprising adjusting customized grounding arrangement options until an impedance is below a threshold associated with the impedance criteria. Element 9: further comprising adjusting customized grounding arrangement options until a ranging signal-to-noise ratio (SNR) is above a threshold associated with the ranging performance criteria.

Element 10: wherein the customized grounding arrangement comprises a metal casing installed in a well separate from the target well and the new well. Element 11: wherein the customized grounding arrangement comprises a ground stake deployed entirely below earth's surface. Element 12: wherein the ground stake is deployed entirely below earth's surface using an open borehole. Element 13: wherein the ground stake is deployed entirely below earth's surface using a pilot hole. Element 14: wherein the customized grounding arrangement comprises an elongated ground stake with an underground length that exceeds a predetermined threshold. Element 15: wherein the customized grounding arrangement comprises a grounding cable with an insulated portion and an exposed portion, wherein the exposed portion is below earth's surface. Element 16: wherein the customized grounding arrangement comprises an insulated cable that extends between the power supply and a location below earth's surface. Element 17: wherein the customized grounding arrangement is spaced from the target well based on predetermined distance or range criteria. Element 18: further comprising a logging tool to collect formation property measurements at one or more points along the target well, wherein the impedance criteria is based on the collected measurements.

Numerous other variations and modifications will become apparent to those skilled in the art once the above disclosure is fully appreciated. For example, the customized grounding arrangements options described herein may also be used to improve safety or performance of production monitoring operations, reservoir monitoring operations, EM telemetry, and/or other operations involving a power supply at earth's surface. It is intended that the following claims be interpreted to embrace all such variations and modifications where applicable.

What is claimed is:

1. A surface excitation ranging method that comprises:
    estimating grounding impedance for a target well based at least in part on one or more testing operations that measure the grounding impedance;
    installing a customized grounding arrangement for a power supply located at earth's surface, wherein the customized grounding arrangement is based at least in part on the estimated grounding impedance for the target well;
    conveying an electrical current output from the power supply along the target well with a metal casing;
    sensing electromagnetic (EM) fields emitted from the target well due to the electrical current; and
    using distance or direction information obtained from the sensed EM fields to guide drilling of a new well relative to the target well.

2. The method of claim 1, wherein installing the customized grounding arrangement comprises connecting the power supply to a metal casing installed in a well separate from the target well and the new well.

3. The method of claim 1, wherein installing the customized grounding arrangement comprises connecting the power supply to a ground stake deployed entirely below earth's surface.

4. The method of claim 3, further comprising drilling an open borehole or using an available open borehole to deploy the ground stake entirely below earth's surface.

5. The method of claim 3, further comprising drilling a pilot hole to deploy the ground stake entirely below earth's surface.

6. The method of claim 1, wherein installing the customized grounding arrangement comprises connecting the power supply to a grounding cable having an insulated portion and an exposed portion, and wherein the exposed portion is below earth's surface.

7. The method of claim 1, wherein installing the customized grounding arrangement comprises connecting the power supply to an elongated ground.

8. The method of claim 1, further comprising spacing the customized grounding arrangement from the target well based on predetermined distance or range, and extending an insulated cable between the power supply and a grounding location below earth's surface.

9. The method according to any one of claim 8, further comprising adjusting customized grounding arrangement options until an impedance is at or below 11 ohms.

10. The method according to any one of claim 8, further comprising adjusting customized grounding arrangement options to improve a ranging signal-to-noise ratio (SNR).

11. A surface excitation ranging system that comprises:
    a power supply located at earth's surface;
    a customized grounding arrangement for the power supply, wherein the customized grounding arrangement is configured based at least in part on one or more testing operations that measure the grounding impedance;
    a target well with a metal casing to convey an electrical current output from the power supply along its length;
    at least one sensor to detect electromagnetic (EM) fields emitted from the target well due to the electrical current; and
    a directional drilling tool to drill a new well relative to the target well based on distance or direction information obtained from the detected EM fields.

12. The system of claim 11, wherein the customized grounding arrangement comprises a metal casing installed in a well separate from the target well and the new well.

13. The system of claim 11, wherein the customized grounding arrangement comprises a ground stake deployed entirely below earth's surface.

14. The system of claim 13, wherein the ground stake is deployed entirely below earth's surface using an open borehole.

15. The system of claim 13, wherein the ground stake is deployed entirely below earth's surface using a pilot hole.

16. The system of claim 11, wherein the customized grounding arrangement comprises an elongated ground stake with an underground length.

17. The system of claim 11, wherein the customized grounding arrangement comprises a grounding cable with an insulated portion and an exposed portion, wherein the exposed portion is below earth's surface.

18. The system of claim 11, wherein the customized grounding arrangement comprises an insulated cable that extends between the power supply and a location below earth's surface.

19. The system of claim 11, wherein the customized grounding arrangement is spaced from the target well based on predetermined distance or range criteria.

20. The system according to any one of claim 11, further comprising a resistivity or conductivity logging tool to collect formation property measurements at one or more points along the target well, wherein the customized grounding arrangement is based on the collected measurements.

* * * * *